3,312,759
Patented Apr. 4, 1967

3,312,759
METHOD OF MAKING OPTICAL ELEMENTS FROM Ba or Mg FLUORIDE CONTAINING BORON NITRIDE
Eugene C. Letter, Walworth, N.Y., assignor to Bausch & Lomb Incorporated, Rochester, N.Y., a corporation of New York
No Drawing. Filed Sept. 23, 1963, Ser. No. 310,844
2 Claims. (Cl. 264—1)

This invention relates to a method for making optical elements and more particularly to an improved method for making infrared transmitting elements.

The production of infrared transmitting windows and other optical elements made of hot pressed alkaline earth fluorides are of increasing importance. Such elements are generally characterized by relatively high transparency to infrared radiation and are often capable of relatively high transmission of radiation at wavelengths up to about 15 microns. Elements of this type have been made in accordance with the methods set forth in my copending applications entitled, "Infrared Transmitting Element and Method of Making Same," Ser. No. 821,040 filed June 17, 1959; and, "Method of Treating Magnesium Fluoride and Pressed Bodies Made Thereby," Ser. No. 59,495, filed Sept. 30, 1960, now U.S. Patent No. 3,114,601.

The transmission may be approximated by:

$$I = I_0 \cdot e^{-Kt} \cdot e^{-ct_e d_3 \left[\frac{n_a - n_b}{\lambda}\right]^2}$$

in which $I$ = intensity of the transmitted radiation
$I_0$ = intensity of the incident radiation
$K$ = absorption coefficient (for thickness in cm.)
$t$ = thickness of compact in cm.
$t_e$ = effective thickness of voids or particles if packed in the most dense packing distribution
$d_3$ = diameter of voids or particles in microns
$n_a$ = refractive index of compact medium
$n_b$ = refractive index of voids or particles (approximately 1.00)
$\lambda$ = wavelength of radiation in microns
$c$ = a constant, taken to be 7

The scattering expression applies only for particles near the same order of magnitude as the wavelength. Very large particles or aggregates of small particles result in scattering over the entire visible and infrared region and should be avoided.

It has now been found that the addition of controlled amounts of preselected impurities into polycrystalline alkaline earth compounds is effective in providing improved infrared transmission characteristics. Advantageously the impurities may be added in the solid, liquid, or gaseous state, and the addition of such impurities affects the transmission characteristics in various particular portions of the spectrum. Generally the addition of the additives is effective in obtaining the fundamental absorption bands of the additive material together with some additional light scattering which is related to the extent that the material does not react with the mixture. It is, however, necessary to limit the amount of additive material to thereby avoid an excess of reaction between the additive and the matrix. An excess of reaction would yield an excessive grain growth and would therefore preclude obtaining a usable hot pressed body.

Briefly, it is contemplated to incorporate the present invention in carrying out a method for making infrared transmitting elements. According to that method which is disclosed and claimed in one of the above-identified applications powdered alkaline earth fluoride is hot pressed at a temperature of 500 to 1300° C. and at a pressure of 2000 to 60,000 pounds per square inch. According to the present invention the powdered alkaline earth fluoride is doped with a predetermined amount of an impurity. The impurity may comprise a carbonate, nitrate, nitride, sulfate, sulfide, oxide, nitrogen, oxygen, carbon dioxide, sulphur dioxide, hydrogen sulfide, water, $NH_4^+$, $SO_3^-$ and also some organic compounds. For example, the presently preferred embodiment of the invention includes powdered barium fluoride mixed with boron nitride. In this embodiment approximately ½ to 15 parts boron nitride are incorporated per 10,000 parts of barium fluoride. This proportion of boron nitride has been found effective to cut off the infrared transmission at approximately 6½ to 7 microns.

The addition is preferably made while the fluoride material is in pulverulent form. For example, the dry solid additive is added and mixed with the powdered fluoride prior to the pressing operation. In other cases the powdered fluoride may be wet with a liquid additive or blended with an additive in gaseous or vapor forms. Alternatively the additive may be added simultaneously with the hot pressing, in which case the fluoride material is not densely preformed, but is placed either loosely or as a porous preformed body in the hot press apparatus.

According to the preferred embodiment of the invention, ½ to 15 parts dry powdered boron nitride is added to 10,000 parts pulverulent barium fluoride. The powders are mixed for example by placing the powders in a mixer for approximately five minutes. The powdered mixture is placed in a die and hot pressed at a temperature of about 700–750° C. and a pressure of about 32,000–35,000 pounds per square inch to thereby form a shaped body.

Generally the time of mixing varies substantially with the amount of materials and type of mixer but should be of sufficient time to obtain a uniform mix. The time of pressing may also vary substantially but is relatively unimportant. The pressing time is regulated only by the physical requirements of obtaining the desired temperature and pressure. In some cases it is desirable to heat and press the material in a controlled atmosphere or a sealed furnace.

Additional embodiments of the present invention are shown by the following examples.

| Example | 1 | 2 | 3 | 4 | 5 | 6 |
|---|---|---|---|---|---|---|
| MgF₂ (grams) | 20 | 25 | 50 | 40 | 10 | 30 |
| Boron Nitride (milligrams) | 1 | 15 | 30 | 10 | 50 | 30 |

| Example | 7 | 8 | 9 | 10 | 11 | 12 |
|---|---|---|---|---|---|---|
| Barium Fluoride (grams) | 20 | 25 | 50 | 40 | 10 | 30 |
| Boron Nitride (milligrams) | 1 | 15 | 30 | 10 | 50 | 30 |

Examples 1–12 were hot pressed at between 700°–750° C. and 32,000–35,000 pounds per square inch.

Example 13 comprises 1% by weight $MgCl_2 \cdot 6D_2O$ added to powdered magnesium fluoride. Most of the $D_2O$ was driven off in the die during hot pressing at approximately 650° C. and 32,000 pounds per square inch. In adding the $D_2O$, it was found necessary to add it in the crystalized complex, rather than in the pure form.

Example 14 comprised 1% by weight $MgCl_2 \cdot 6H_2O$ to powdered magnesium fluoride. The pressing of Example 14 may be carried out according to the conditions used for Example 13.

What is claimed is:
1. A method for making an infrared transmitting on- tical element comprising hot pressing a pulverulent mass of an alkaline earth fluoride selected from the group consisting of barium fluoride and magnesium fluoride together with boron nitride at a temperature of approximately 700 to 750° C. and a pressure of about 32,000 to 35,000 pounds per square inch.

2. A method of making an infrared transmitting optical element according to claim 1 in which the boron nitride is present in an amount of approximately ½ to 15 parts per 10,000 parts of fluoride material.

References Cited by the Examiner

Kreidl et al.: Fabrication of Infrared Transmitting Materials By Hot Pressing Techniques, WADC Tech. Report 58-275, Part I, ASTIA Document No. 202844, Wright Air Development Center, Wright-Patterson Air Force Base, Ohio (Bausch & Lomb Optical Co. report printed in October 1958, pp. iii, 1–24).

Kreidl, et al.: Fabrication of Infrared Transmitting Materials By Hot Pressing Techniques, WADC Tech. Report No. 58-275, Part II, ASTIA Document 233358, Wright Air Development Center Wright-Patterson Air Force Base, Ohio (Bausch & Lomb Optical Co. report printed in October 1959, pp. iii, 1–19).

ALEXANDER H. BRODMERKEL, *Primary Examiner.*

R. B. WHITE, *Examiner.*

F. S. WHISENHUNT, A. H. KOECKERT,
*Assistant Examiners.*